United States Patent Office 3,309,220
Patented Mar. 14, 1967

3,309,220
METHOD OF PRODUCING AN ULTRAVIOLET RESISTANT POLYCARBONATE ARTICLE
Mitchell M. Osteen, Zirconia, N.C., assignor to General Electric Company, a corporation of New York
No Drawing. Filed Apr. 10, 1964, Ser. No. 358,921
5 Claims. (Cl. 117—33.3)

This invention relates to polycarbonate resin and more particularly to a process for producing formed articles, such as a luminaire refractor or lens, of polycarbonate resin exhibiting a vastly superior resistance to ultraviolet radiation.

The vast majority of all organic polymeric materials undergo some mode of degradation when exposed to the high energy photons of ultraviolet light. Oxygen, moisture and temperature have been shown to play an important role in many cases. The degradation manifests itself depending on the material in yellowing, discoloration, embrittlement and other loss of physical properties. Polycarbonate resin is no exception and it is, therefore, an object of this invention to provide an improved method of producing a polycarbonate resin article which is highly resistant to ultraviolet radiation degradation.

With respect to resin classes, such as polyesters, polyolefins, vinyls, and polystyrene, the use of ultraviolet absorbers to provide protection against ultraviolet attack has been suggested. The absorber functions by reason of its ability to screen out the damaging ultraviolet portion of light due to its very high absorptivity relative to that of the polymer. In order to qualify as a successful ultraviolet light absorber for addition to a polycarbonate resin, there are several requirements which the absorber must fulfill. The absorber must have a high specific absorptivity in the range of wave lengths that are most deleterious to the material and that are present in the source of exposure. The absorber itself must be photochemically stable and be able to dissipate the absorbed energy, for example, as heat energy, without itself being decomposed or causing degradation of the plastic. In addition, the absorber must not significantly absorb in the visible region of the spectrum or a color will be imparted to the material to which it has been added. The absorber must exhibit compatibility with the resin and not degrade it with loss of properties and increase in color. The absorber must also have a sufficiently low volatility to permit its continued residence in the polymer. Two types of organic compound found to fulfill these conditions are the benzophenones and substituted benzotriazoles. Within these groups the members thereof exhibit a variety of usefulness and it is much preferred that either 2,2' dihydroxy-4,4' dimethoxy benzophenone or 2(2'-hydroxy 5'-methyphenol) benzotriazole be used in carrying out the invention herein.

The polycarbonate resins used in the practice of this invention are high molecular weight aromatic carbonate polymers which may be prepared by reacting a dihydric phenol with a carbonate precursor such as phosgene, a haloformate or a carbonate ester. Generally speaking, such carbonate polymers may be typified as possessing recurring structural units of the formula

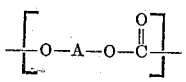

where A is a divalent aromatic radical of the dihydric phenol employed in the polymer producing reaction. By "high molecular weight" aromatic carbonate polymers, carbonate polymers having intrinsic viscosities (as measured in p-dioxane in deciliters per gram at 30° C.) greater than about 0.40 and, preferably, above about 0.50 are referred to. The dihydric phenols which may be employed to provide such aromatic carbonate polymers are mononuclear or polynuclear aromatic compounds, containing as functional groups, 2 hydroxyl radicals, each of which is attached directly to a carbon atom of an aromatic nucleus. Typical dihydric phenols are 2,2 bis-(4-hydroxyphenyl)-propane; 2,2 bis-(4-hydroxyphenyl)-pentane; 2,2 bis-(4-hydroxy 3 methyl phenyl) propane; 2,2 bis-(4-hydroxy 3,5 dichloro phenyl) propane; 2,2 bis-(4-hydroxy 3,5 dibromo phenyl) propane; 1,1 bis-(4-hydroxyphenyl)-ethane; 4,4' dihydroxy 3,3 dichloro diphenyl ether. A variety of additional dihydric phenols which may be employed to provide such carbonate polymers are disclosed in U.S. Patent No. 2,993,835—Goldberg, assigned to the assignee of the present invention. It is, of course, possible to employ two or more different dihydric phenols or a dihydric phenol in combination with a glycol, a hydroxy or acid terminated polyester, or a dibasic acid in the event a carbonate copolymer rather than a homopolymer is desired for use in the practice of the invention. It should be understood that the term "polycarbonate resin" embraces within its scope carbonate copolymers.

When a carbonate ester is used as the carbonate precursor in the polymer forming reaction, the materials are reacted at temperatures of from 100° C. or higher for times varying from 1 to 15 hours. Under such conditions ester interchange occurs between the carbonate ester and the dihydric phenol used. The ester interchange is advantageously consummated in an inert atmosphere, such as nitrogen or argon, for example.

Although the polymer forming reaction may be conducted in the absence of a catalyst, one may, if desired, employ the usual ester exchange catalysts, such as, for example, metallic lithium, potassium, calcium and magnesium. Additional catalysts and variations in the exchange methods are discussed in Groggins, "Unit Processes in Organic Synthesis" (4th edition, McGraw-Hill Book Company, 1952), pages 616 to 620. The amount of such catalyst, if used, is usually small, ranging from about 0.001 to about 0.1%, based on the moles of the dihydric phenol employed.

The carbonate ester useful in this connection may be aliphatic or aromatic in nature, although aromatic esters, such as diphenyl carbonate, are preferred. Additional examples of carbonate esters which may be used are dimethyl carbonate, diethyl carbonate, phenylmethyl carbonate, phenyltolyl carbonate and di(tolyl) carbonate.

A preferred method for preparing the carbonate polymers suitable for use in the practice of the present invention involves the use of a carbonyl halide, such as phosgene, as the carbonate precursor. The method involves passing phosgene gas into a reaction mixture containing the dihydric phenol and an acid acceptor such as a tertiary amine (e.g., pyridine, dimethylaniline, quinoline, etc.). The acid acceptor may be used undiluted or diluted with inert organic solvents as, for example, methylene chloride, chlorobenzene, or 1,2 dichloroethane. Tertiary amines are advantageous since they are good solvents as well as acid acceptors during the reaction.

The temperature at which the carbonyl halide reaction proceeds may vary from below 0° C. to above 100° C. The reaction proceeds satisfactorily at temperatures from room temperature (25° C.) to 50° C. Since the reaction is exothermic, the rate of phosgene addition may be used to control the reaction temperature. The amount of phosgene required will generally depend upon the amount of dihydric phenol present. Generally speaking, one mole of phosgene will react with one mole of the dihydric phenol used to provide the polymer and two moles of HCl. Two moles of HCl are in turn "attached" by the acid acceptor present. The foregoing are herein referred to as stoichiometric or theoretical amounts.

Another method for preparing the polycarbonate resin useful in the practice of the invention comprises adding phosgene to an alkaline aqueous suspension of the dihydric phenol used. This is preferably done in the presence of inert solvents such as methylene chloride, 1,2 dichloro ethane and the like. Quaternary ammonium compounds may be employed to catalyze the reaction.

A further method for preparing such carbonate polymers involves the phosgenation of an agitated suspension of the anhydrous alkali salts of the dihydric phenol used in a non-aqueous medium such as benzene, chlorobenzene, and toluene. This reaction is illustrated by the addition of phosgene to a slurry of the sodium salt of 2,2 bis-(4-hydroxyphenyl)-propane in an inert polymer solvent such as chlorobenzene. The organic solvent should preferably be a polymer solvent but need not necessarily be a good solvent for the reactants.

Generally speaking, the haloformates of dihydric phenols, such as the bishaloformate of 2,2 bis-(4-hydroxyphenyl)-propane, for example, may be substituted for phosgene as the carbonate precursor in any of the methods described above.

In each of the above solution methods of preparation, the carbonate polymer emerges from the reaction in either a true or pseudo solution whether aqueous base or pyridine is used as an acid acceptor. The polymer may be precipitated from the solution by adding a polymer nonsolvent, such as heptane or isopropanol. Alternatively, the polymer solution may be heated to evaporate the solvent.

The use of ultraviolet light absorbers in other polymers has either been by addition of the absorber into the bulk material, which may be referred to as bulk stabilization, or by coating the absorber on the surface of the article to be protected. Usually this has been a matter of choice depending on the article, the material or the conditions under which the article is formed. If the absorber is added to the bulk material, it must, of course, have the property of withstanding the temperatures and conditions necessary to form the article. If it is coated on the formed article, it must, of course, form a coating which does not peel or volatilize from the surface of the article. Ordinarily, one would not expect that the results obtained from either process would be vastly different. However, as shall be noted from the hereinafter given examples, a polycarbonate article protected with ultraviolet absorber in accordance with the invention by coating the article offers vastly superior advantages compared to bulk stabilized polycarbonate material.

It has previously been suggested that the use of plastic materials for refractors or globes for outdoor lighting luminaires is desirable and in some cases plastic refractors or globes have been substituted for the glass previously used. However, the use of plastic refractors has to a large extent been limited to use with luminaires utilizing incandescent lamps or low-wattage discharge lamps because of a continued build-up of discoloration of the plastic under the ultraviolet energy emitted by high wattage lamps such as the mercury arc discharge lamps. Under a high wattage discharge lamp, such as a 400-watt mercury arc lamp, the degradation of plastics referred to above is rapidly accelerated. Not only does the embrittlement of the plastic render it much more susceptible to destruction on impact, but the yellowing is unsightly and interferes with the transmissibility of light through the refractor. Such a refractor or globe for luminaire use has previously been made as disclosed in copending application Serial No. 294,517, assigned to the same assignee as herein. It is an object of this invention to provide an improved method for producing a refractor or globe of polycarbonate resin for luminaire use in which the above-mentioned disadvantages are greatly reduced, if not completely eliminated.

In accordance with the invention, there is provided a method of producing an ultraviolet light-resistant polycarbonate article comprising the steps of forming an article consisting essentially of polycarbonate resin and then dipping the article into a boiling water bath containing approximately .01–5% by weight of an ultraviolet absorber.

While the article has been described as having a definite coating layer on the surface thereof, this layer is so thin as to not be observable in an actual practice. Therefore, it should be understood that as used herein, the term "coating" not only applies to a definite layer on the surface of the polycarbonate article but also to a high concentration of material near the surface of the article or a combination of the two, so long as produced by the herein disclosed process.

In accordance with the invention, an article consisting essentially of polycarbonate resin is formed in a conventional manner, for example by injecting polycarbonate material into a mold. Other methods, such as extrusion, cold forming, vacuum forming, blow molding, compression molding, transfer molding and other methods which will be obvious to one skilled in the art, may be used to form the article. The article may be in any shape and need not be a finished article of commerce, that is, it could be merely sheet material which would be cut or mechanically shaped into a finished article without disturbing the protective coating to be applied by the process. Therefore, as used herein it will be understood that the term "article" refers to any shape of polycarbonate resin whether finished or stock material so long as the surface coating is not disturbed by any further working operation.

The formed polycarbonate article is then dipped into a boiling water bath containing an ultraviolet absorbing compound for a period of time sufficient to effectively coat the surfaces of the article. The temperature of the bath may range from 90° C. to 100° C. but the agitation of boiling is preferred so as to maintain the suspension of absorber.

The ultraviolet absorbing compound in the bath may be any of the known ultraviolet absorbing compounds such as disclosed in U.S. Patent No. 3,043,709 but the preferred compounds are Uvinul D49, which is General Aniline's commercial name for 2,2'-dihydroxy-4,4'-dimethoxy benzophenone, Uvinul D50, Antara Chemical's name for 2,2',4,4'-tetrahydroxy-benzophenone, Uvinul 400, Antara's 2,4-dihydroxy-benzophenone and Tinuvin P, Geigy Chemicals' commercial name for 2(2'-hydroxy-5'-methylphenyl) benzotriazole.

As disclosed in the aforementioned application Serial No. 294,517, the bath must be inert to the polycarbonate material and provide a suspension or solution of absorber to be coated on the article. While water is ideal from this standpoint, it was not known that the polycarbonate resin material would be coated at the low temperatures available when using water in an open system. Heretofore the ultraviolet absorbing material has been applied to the surface of a plastic by dipping the plastic into a heated, 130°–200° C., solution of the ultraviolet absorber, 3%, in mineral oil 97%. The time of dip varied with temperature of dip but a typical combination for treating polycarbonate was a fifteen minute dip in the solution held at 130° C. This process is described in detail in the aforementioned co-pending application Serial No. 294,517, filed July 12, 1963, in the name of T. L. Etherington, and entitled, "Method of Producing an Ultraviolet Resistant Polycarbonate Article." The process disclosed herein allows dipping at 100° C. which is below the melting point of many effective absorbers, uses water as a carrier instead of an oil and may involve a change in the mechanism of coating.

Most ultraviolet light absorbers are only slightly soluble in water. However, water containing ultraviolet absorbers in amounts of ½% to 3% by weight has been discovered to be an effective carrier or medium for applying the protective coating. In each case there was an abundance of undissolved ultraviolet absorber in constant motion due to the vigorously boiling water.

In accordance with the invention, a suspension of ½% Uvinul D49, an ultraviolet absorber produced by Antara Chemical Company, 99½% water was prepared by weight. A second suspension of ½% Uvinul 400, same producer, 99½% was prepared.

Samples 1–7 were cut from non-bulk-stabilized sheet stock 1/16″ thick to dimensions of 1/16″ x 1¼″ x 2½″. Samples 1–3 were then dipped in the suspension of Uvinul D49 and Samples 4–6 were dipped in the suspension of Uvinul 400. Sample 7 was not treated and served as a control. Each suspension was vigorously boiled during the treatment of polycarbonate resin Samples 1–6. The volume of water was maintained during the treating process by frequent additions of preheated water. After the samples were dipped, they were rinsed in hot faucet water for 30 seconds and dried with absorbent towels.

After initial measurement of the yellowness factor, these samples were exposed to the ultraviolet radiation emanating from a General Electric H400 E1 Hg lamp in an exposure chamber at an ambient temperature of 100° C.

The time of dip of each sample, the initial yellowness factor, and the yellowness factor after specified hours of exposure are shown in the chart below.

| No. | Dip Time (Min.) | Yellowness Factor (percent) | | | |
|---|---|---|---|---|---|
| | | Initial | 208 hrs. | 373 hrs. | 537 hrs. |
| 1 | 5 | 14 | 26 | 28 | 41 |
| 2 | 9 | 15 | 28 | 35 | 51 |
| 3 | 20 | 16 | 29 | 36 | 45 |
| 4 | 5 | 8 | 32 | 36 | 45 |
| 5 | 9 | 11 | 42 | 42 | 61 |
| 6 | 20 | 13 | 27 | 40 | 48 |
| 7 | 0 (control) | 9 | 56 | 71 | 73 |

The yellowness factor, Y. F., was calculated in each case by $$YF = \frac{T_{640} - T_{470}}{T_{560}} \times 100$$

where T represents the percent transmission at the subscript wavelength, m$\mu$, of the sample as compared to air in a Bausch & Lomb Spectrophotometer.

A second group of samples 8–21, using the same polycarbonate material prepared as described above, was treated by the water carrier process with a higher concentration of Uvinul D49 and other absorbers to measure the effect of such higher concentrations in the water bath. Samples 8–12 were treated in a bath prepared of 3% Uvinul D49 by weight and 97% water by weight. Samples 13–16 were treated in a bath prepared of 3% Tinuvin P, a product of Geigy Industrial Chemical, by weight and 97% water by weight. Samples 17 and 18 in a similar bath prepared with Cyasorb UV24, a product of American Cyanamid, and Sample 19 was similarly prepared with Uvinul D50. The D49 appeared to be dissolved by the water to no more than .1%; the Tinuvin P is also only slightly soluble and, therefore, had a larger excess of solids in motion during the boiling action in the same manner. Cyasorb UV24 is also soluble to an extent much less than 3% but melts at a temperature below the boiling point of water giving molten globules circulating during the boiling action; and finally the D50 was completely water soluble in the 3% proportion. Since initial attempts to use the Cyasorb UV24 with the molten but undissolved material circulating in the boiling water produced an article with Cyasorb UV24 fused to it, rendering it useless as a light transmitting material, all the undissolved molten Cyasorb UV24 was removed from the bath with cotton swabs. Sample 20 was treated in a mineral oil bath containing 3% Uvinul D49 at 130° C. in accordance with the process disclosed in the aforementioned copending application Serial No. 294,517. Samples 8–11 and 13–19 were treated exactly as the previous examples given. Sample 21 was untreated to serve as a control. Sample 12 was treated similarly except that the bath was held merely at a slow boil without too great an agitation.

The chart below summarizes the treatment and ultraviolet degradation in the form of yellowing on these samples as well as a control 20 prepared by the conventional dip treating in a 3% solution of Uvinul D49 in mineral oil for 15 minutes at 130° C. as well as a non-treated sample 21.

| No. | Dip Time (Min.) | Yellowness Factor (percent) | | |
|---|---|---|---|---|
| | | Initial | 189 hrs. | 348 hrs. |
| 8 | 5 | 4 | 25 | 39 |
| 9 | 10 | 7 | 32 | 41 |
| 10 | 15 | 8 | 31 | 44 |
| 11 | 20 | 7 | 34 | 49 |
| 12 | 15 | 6 | 33 | 53 |
| 13 | 5 | 13 | 64 | 81 |
| 14 | 10 | 12 | 47 | 73 |
| 15 | 15 | 12 | 37 | 59 |
| 16 | 30 | 14 | 28 | 41 |
| 17 | 1 | 5 | 31 | 50 |
| 18 | 5 | 6 | 30 | 43 |
| 19 | 120 | 3 | 59 | 79 |
| 20 | 15 | 10 | 29 | 44 |
| 21 | 0 (control) | 10 | 53 | 76 |

Three types of transparent polycarbonate resin material were tested to determine the effectiveness of the invention. Group A was plain polycarbonate resin, containing neither ultraviolet absorber nor blue tint and includes Samples 22–29. Group B (Samples 30–37) contained blue tint but not ultraviolet absorber. Group C (Samples 38–45) contained both ultraviolet absorber (.5% Tinuvin P by weight) and blue tint. The blue tint is an additive which attenuates the transmitted light at the yellow-red end of the visible spectrum—thus giving an approximately flat curve of transmittance versus wavelength from 400–700 m$\mu$. This avoids a yellowish tint which is present in natural polycarbonate resin.

In all cases the even numbered samples were untreated to serve as controls with the material being exposed in the test chamber as received from the supplier. Samples 23, 25, 31, 33, 39 and 41 were dipped in a suspension of .05% D49 in water, for 15 minutes while the water was kept boiling. Samples 27, 29, 35, 37, 43 and 45 were dipped for 15 minutes in a suspension of 3% D49–97% mineral oil (ESSO Primol 355). The mineral oil carrier dip was at 130° C.

In the case of the water bath, the suspension of D49 was maintained by a tea-bag principle as follows: approximately ¼ pint of Uvinul D49 was placed in a small cotton fabric bag. This bag of Uvinul D49 was sewed shut and dropped into a beaker containing three liters of boiling water. The water level was maintained by adding preheated tap water as needed. Three grams of oxalic acid were also added to the solution to act as a chelating agent and tie up the iron oxide in the tap water. This oxalic acid is necessary if iron is present but can be omitted if clean water is used with a container of aluminum or glass. The preparation was allowed to boil for 10 hours before dipping began. This was a much longer period of time than was necessary but some time must be allowed for the Uvinul D49 to dissolve and disperse in the water. Proper bag design and the addition of glass fibers to keep the power finely divided would cut the preparation time to as low as 15 minutes. This preparation maintains a concentrated suspension without the necessity for loose powder in the bath.

Gravimetric and spectrophotometric analysis showed that such a suspension of water contains 500±50 milligrams of D49 per liter.

After dipping, all samples were rinsed, dried and tested as above, with results as shown by the following chart:

| Group | No. | Yellowness Factor (Percent) | | | |
|---|---|---|---|---|---|
| | | Initial | 93 hrs. | 162 hrs. | 287 hrs. | 573 hrs. |
| A | 22 | 9 | 32 | 47 | 54 | 58 |
| A | 23 | 11 | 17 | 21 | 27 | 30 |
| A | 24 | 8 | 51 | 52 | 54 | 53 |
| A | 25 | 13 | 20 | 20 | 26 | 31 |
| A | 26 | 9 | 29 | 47 | 51 | 57 |
| A | 27 | 9 | 20 | 25 | 27 | 30 |
| A | 28 | 10 | 58 | 56 | 60 | 54 |
| A | 29 | 11 | 19 | 23 | 28 | 33 |
| B | 30 | 11 | 37 | 47 | 44 | 57 |
| B | 31 | 14 | 23 | 25 | 30 | 31 |
| B | 32 | 11 | 52 | 54 | 55 | 55 |
| B | 33 | 15 | 19 | 23 | 26 | 32 |
| B | 34 | 11 | 37 | 47 | 51 | 56 |
| B | 35 | 11 | 21 | 23 | 29 | 29 |
| B | 36 | 12 | 57 | 57 | 57 | 60 |
| B | 37 | 15 | 21 | 26 | 30 | 32 |
| C | 38 | 10 | 15 | 28 | 30 | 34 |
| C | 39 | 14 | 19 | 24 | 27 | 32 |
| C | 40 | 8 | 25 | 28 | 27 | 30 |
| C | 41 | 13 | 19 | 20 | 25 | 28 |
| C | 42 | 9 | 15 | 23 | 31 | 32 |
| C | 43 | 9 | 20 | 21 | 26 | 30 |
| C | 44 | 6 | 27 | 31 | 33 | 30 |
| C | 45 | 12 | 17 | 23 | 28 | 33 |

The light transmission quality of polycarbonate articles is not too greatly deleteriously affected until the yellowness factor exceeds 40%. With this as a guide we may conclude that several dip times for the Uvinul D49-water combination and at least one dip time for the Cyasorb UV24 water combination is at least as effective in preventing yellowing as is the conventional absorber and mineral oil treatment. The Tinuvin P-water treatment would appear less desirable because of a lesser degree of protection in combination with a high initial attenuation in transmitted light immediately after treatment. The melting point of highly effective absorbers Uvinul D49 and Uvinul 400, respectively, is well above the boiling point of the water carrier.

From the above, it may be concluded that the degree of protection against ultraviolet degradation given by this process using water as a carrier for the ultraviolet absorber is at least the equivalent of that given by the former process using oil as the carrier.

Some of the advantages of using water as a carrier are lower operating temperature, thus reducing safety hazards and warpage of formed parts; elimination of washing after treatment in order to remove all traces of mineral oil; and a cost reduction in both carrier (water versus mineral oil) and the amount of the absorber necessary.

What is claimed as new and desired to be secured by Letters Patent of the United States is:

I claim:

1. A process for the manufacture of an article consisting essentially of polycarbonate resin having a high resistance to degradation by ultraviolet light which comprises the steps of forming polycarbonate resin into an article and then dipping said article into a bath consisting essentially of an aqueous solution and dispersion of an ultraviolet absorbing compound selected from the group consisting of substituted derivatives of benzotriazole and substituted derivatives of benzophenone, said bath being maintained at a temperature of about 90° C. to about 100° C.

2. A process as defined in claim 1, wherein said ultraviolet absorbing compound is introduced into the bath by immersing in the bath a porous container holding the ultraviolet absorbing compound in finely divided particles, whereby said compound is transferred into the bath from said container for maintaining a concentrated suspension thereof in the bath.

3. A process for the manufacture of an article consisting essentially of a polycarbonate resin having a high resistance to degradation by ultraviolet light comprising the steps of forming polycarbonate resin into an article and then dipping said article into a bath consisting essentially of an aqueous solution and dispersion of 0.01 to 5% by weight of an ultraviolet absorbing compound selected from the group consisting of substituted derivatives of benzotriazole and substituted derivatives of benzophenone, said bath being maintained at a temperature of about 90° C. to about 100° C.

4. A process as defined in claim 3 wherein the ultraviolet absorbing compound is 2,2'-dihydroxy-4,4'-dimethoxy benzophenone.

5. A process as defined in claim 3 wherein the ultraviolet aborbing compound is 2(2'-hydroxy-5'-methylphenyl) benzotriazole.

References Cited by the Examiner

UNITED STATES PATENTS

| 2,799,666 | 7/1957 | Caldwell | 260—47 |
| 3,043,709 | 7/1962 | Amborski | 117—7 |
| 3,049,443 | 8/1962 | Coleman | 117—138.8 |
| 3,178,378 | 4/1965 | Winchell | 117—138.8 X |

WILLIAM D. MARTIN, *Primary Examiner.*

T. G. DAVIS, *Assistant Examiner.*